United States Patent
Puvvada et al.

(10) Patent No.: US 11,954,073 B2
(45) Date of Patent: Apr. 9, 2024

(54) MULTI-PROTOCOL MULTI-SITE REPLICATION

(71) Applicant: International Business Machines Corporation, Armonk, NY (US)

(72) Inventors: Venkateswara Rao Puvvada, Inkollu (IN); Saket Kumar, Bettiah (IN); Karrthik Kalaga Gopalakrishnan, Kodaikanal (IN); Ashish Pandey, Pune (IN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 17/695,894

(22) Filed: Mar. 16, 2022

(65) Prior Publication Data

US 2023/0297548 A1 Sep. 21, 2023

(51) Int. Cl.
*G06F 16/178* (2019.01)

(52) U.S. Cl.
CPC .................. *G06F 16/178* (2019.01)

(58) Field of Classification Search
CPC ..................................... G06F 16/178
USPC .......................................... 707/614
See application file for complete search history.

(56) References Cited

U.S. PATENT DOCUMENTS

| | | | | |
|---|---|---|---|---|
| 5,689,706 A | * | 11/1997 | Rao | G06F 16/184 |
| 7,966,293 B1 | * | 6/2011 | Owara | G06F 11/1448 707/956 |
| 8,595,189 B2 | * | 11/2013 | Patwardhan | G06F 16/184 707/646 |
| 9,430,331 B1 | * | 8/2016 | Basov | G06F 16/10 |
| 10,521,344 B1 | * | 12/2019 | Chawla | G06F 11/0727 |
| 11,327,857 B2 | * | 5/2022 | Bhargava M R | G06F 16/9024 |
| 11,442,652 B1 | * | 9/2022 | Dailey | H04L 41/0894 |
| 11,650,886 B2 | * | 5/2023 | Mathew | G06F 11/1484 707/649 |
| 2003/0182330 A1 | * | 9/2003 | Manley | H04L 67/06 |
| 2009/0055399 A1 | * | 2/2009 | Lu | G06F 16/172 |
| 2014/0180915 A1 | * | 6/2014 | Montulli | H04L 51/08 705/40 |

(Continued)

FOREIGN PATENT DOCUMENTS

| | | |
|---|---|---|
| CN | 111052106 A | 4/2020 |
| CN | 111666179 A | 9/2020 |

(Continued)

OTHER PUBLICATIONS

"Hardlinks Recovery without Using Inode Numbers in the Object Storage Systems", 9 pps., An IP.com Prior Art Database Technical Disclosure, IP.com No. IPCOM000265601D, IP.com Electronic Publication Date: Apr. 28, 2021.

(Continued)

*Primary Examiner* — Cam Linh T Nguyen
(74) *Attorney, Agent, or Firm* — Grant Johnson

(57) ABSTRACT

Disclosed are techniques for multi-protocol multi-site file replication, including a method comprising capturing, at a gateway device, IO operations performed on a filesystem, the filesystem having inode bits. The method may further comprise enqueuing the captured IO operations onto a plurality of queues, wherein each of the plurality of queues is associated with one of a plurality of target sites; and independently managing replication of the IO operations to the target sites using the inode bits.

20 Claims, 6 Drawing Sheets

(56) References Cited

U.S. PATENT DOCUMENTS

| | | | |
|---|---|---|---|
| 2015/0019491 A1 | 1/2015 | Hunt | |
| 2015/0278244 A1* | 10/2015 | Shvachko | G06F 16/182 |
| | | | 707/634 |
| 2016/0162372 A1* | 6/2016 | Whitehead | G06F 3/065 |
| | | | 707/654 |
| 2018/0260409 A1* | 9/2018 | Sundar | G06F 16/172 |
| 2019/0332582 A1 | 10/2019 | Kumar | |
| 2020/0110831 A1 | 4/2020 | Sure | |
| 2020/0372046 A1* | 11/2020 | Vijayan | G06F 16/184 |
| 2021/0255933 A1 | 8/2021 | Puvvada | |
| 2021/0294702 A1 | 9/2021 | Guim Bernat | |
| 2021/0342271 A1* | 11/2021 | Faibish | G06F 3/067 |
| 2021/0357293 A1* | 11/2021 | Mathew | G06F 16/215 |
| 2021/0365206 A1* | 11/2021 | Liu | G06F 3/0644 |
| 2022/0019350 A1* | 1/2022 | Karr | G06F 3/0617 |
| 2022/0027059 A1* | 1/2022 | Chen | G06F 3/0689 |
| 2022/0030062 A1* | 1/2022 | Jennings | H04L 69/16 |
| 2022/0138223 A1* | 5/2022 | Sonner | G06F 16/27 |
| | | | 707/620 |
| 2022/0350642 A1* | 11/2022 | Poddar | G06F 8/71 |
| 2023/0008978 A1* | 1/2023 | Puvvada | G06F 3/067 |
| 2023/0138337 A1* | 5/2023 | Mufti | G06F 11/1464 |
| | | | 711/162 |

FOREIGN PATENT DOCUMENTS

| | | |
|---|---|---|
| CN | 113626522 A | 11/2021 |
| CN | 114116326 A | 3/2022 |
| WO | 2023173959 A1 | 9/2023 |

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

PCT/CN2023/074810, International Search Report and the Written Opinion of the International Searching Authority, dated Mar. 16, 2023, 7 pages.

* cited by examiner

MULTI-PROTOCOL MULTI-SITE REPLICATION

BACKGROUND

The present disclosure relates to file replication, and more specifically, multi-protocol multi-site file replication.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the relatively higher performance of those capabilities, resulting in computer systems today that are more powerful than just a few years ago.

These new computer systems have become an important part of many business process and individual users' lives. As a result, it has become increasingly desirable to save multiple copies of any information stored on these systems to protect that information from undesired deletion, hardware failure, power failure, natural disasters, and/or other events that may render that data temporarily and/or permanently unavailable. These copies may be stored on storage devices that are local to each other (e.g., mirroring one hard drive or partition in a system onto a second hard drive or partition in the same system), or may be physically and geographically remote (e.g., replicating information onto a backup system physically located in a different city), with the data transferred across a computer network. The backup process may be performed periodically (e.g., as weekly copies on physical media) or may be performed substantially continuously.

SUMMARY

According to embodiments of the present disclosure, a method for multi-site replication from a single production site, comprising capturing, at a gateway device, IO operations performed on a filesystem, the filesystem having inode bits. The method may further comprise enqueuing the captured IO operations onto a plurality of queues, wherein each of the plurality of queues is associated with one of a plurality of target sites; and independently managing replication of the IO operations to the target sites using the inode bits. In some embodiments, a number of the inode bits may be based on a number of target sites. In some embodiments, one of the inode bits may encode a plurality of replication states for reach of the remote sites. In some embodiments, the replication states may be chosen from the group consisting of replication is pending and replication is completed. In some embodiments, a first of the plurality of target sites may comprise a first backend; and wherein a second of the plurality of target sites may comprise a second backend, the second backend being different from the first backend. In some embodiments, managing replication of the IO operations may comprise maintaining a parent and a children handler on the gateway device. In some embodiments, each of the plurality of queues may be responsible to replicate data to a target cloud. In some embodiments, the method may further comprise metering IO operations to be replicated; and generating an invoice based on the metered use.

A further aspect provides a computer program for implementing the method.

A further aspect provides a corresponding computer program product.

A further aspect provides a system for implementing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
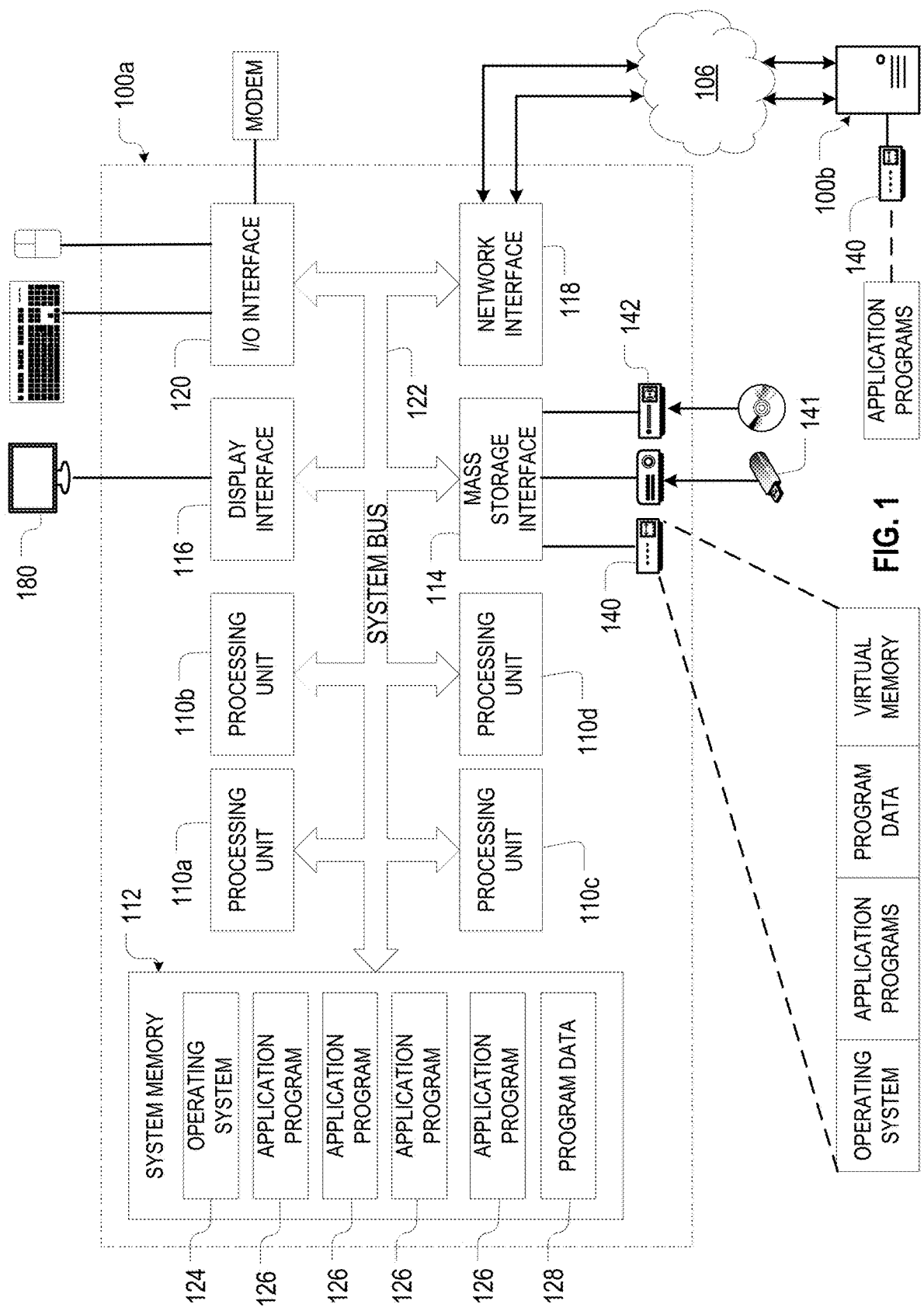
FIG. 1 illustrates one embodiment of a data processing system (DPS), consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to file replication; more particular aspects relate to multi-protocol multi-site file replication. While the present disclosure is not necessarily limited to such applications, various aspects of the disclosure may be appreciated through a discussion of various examples using this context.

In some data replication environments, one site may act as a production site/cluster (also known as the cache site) and one site may be designed as a backup site/cluster (also known as the home site). The production site may capture all input/output (IO) operations being performed on the local fileset and/or filesystem, and may maintain a local queue of IO operations organized in a first-in-first-out (FIFO) queue order. This local queue may be maintained on just one node of the production site/cluster, which may be designated as the "gateway node" or "gateway device" for the cluster. The gateway device, in turn, may maintain the queue in its memory. All the application nodes in the cluster may generate remote procedure calls (RPCs) when a local operation is performed, such that the RPC updates the queue on the designated gateway device with the operation that is to be performed on the fileset. The gateway device may also apply various optimization techniques to the operations in the queue, e.g., such as coalescing small contiguous write operations into single write operation, before sending the operations asynchronously to a remote cluster (also known as a home cluster or "secondary site").

In clustered filesystem embodiments, replication may be performed between a clustered filesystem (e.g., an on-prem site) and another cluster filesystem (e.g., an off-prem site), between a clustered filesystem and a cloud object storage, between a clustered filesystem and multiple backends (e.g., a local backup and two different cloud providers), etc. Such replication may be over an open standard based protocol, such as the network filesystem ("NFS"), or it can be backed by the filesystem protocol itself. In the latter case, both the production and the backup filesystems may be of the same filesystem type, e.g., IBM SpectrumScale™, available from IBM Corporation of Armonk, York.

The backend systems in some embodiments may utilize a Portable Operating System Interface (POSIX) compliant protocol, such as NFS or the GPFS filesystem, available from IBM Corporation of Armonk, New York. These protocols may be desirable in many applications because any POSIX compliant operations that were accepted by the production system can also be replicated to the backup site filesystem through the underlying protocol. Moreover, administrators for the production systems can expect the remote filesystem to have such support. Alternatively, some or all of the backend systems in some embodiments may utilize various cloud object protocols that are not POSIX complaint but for which at least the most common POSIX compliant operations (e.g., create, write, setattr, rename, remove, hard links, and symbolic links) are supported by that protocol.

In some embodiments, the cache site that hosts the POSIX filesystem may have three different modes of operation:
1. Where the cache generates the data (e.g., at a production site) and the remote site is a mere backup site receiving the data in the form of objects sent from the Cache site. This mode of operation for the cache is referred to as a Single Writer (SW) mode.
2. Where the home site can generate the data and the cache site is a receiver, the cache site may pull the data over for backup or processing it at the cache site. This mode of operation for the cache is referred to as a Read Only (RO) mode.
3. A hybrid mode that support supports both pull and push mechanisms (discussed below).

This mode of operation for the cache is referred to as a Multi Writer (MW) mode. Some aspects of the disclosure may be particularly desirable for use in SW mode and MW mode because they may support pushing of data from the local cache site over to the remote backup site. Some embodiments also may be desirable because they can support the many-to-one mappings of MW mode via an extension of their one-to-one SW mode mapping. That is, the many-to-one mapping of MW mode in some embodiments may extend SW mode such that multiple cache sites can point to a single home site. Moreover, because MW mode can both push and pull, some embodiments can maintain accuracy and completeness data at any one site by combining the local data generated and the remote data acquired in a seamless fashion.

Some embodiments may be desirable because they can enable replication to multiple backup sites from a single cache site, e.g., to maintain more than one backup copy of the data. With respect to cloud object stores and/or multiple third-party storage services, some embodiments may enable a cache site that can capture data and send it to multiple remote sites (e.g., multiple clouds provided by different cloud service vendors). Additionally, or alternatively, some embodiments enable the one or more POSIX compliant backends, as well as applications for which the cache can replicate to POSIX compliant systems (e.g., to multiple NFS/native filesystem backends, one NFS and one native filesystem backend, one NFS and multiple cloud object backends, etc.)

Some embodiments may be desirable because they can differentiate and separately manage one target remote site from another target remote site for replication. Some embodiments may manage these multiple backends by using certain bits on their inode file data structure (e.g., create/ dirty/setattr bits). The bits may denote whether or not the IO operation in question (e.g., create or write) has been successfully replicated with respect to a particular single remote site in question. For example, in some embodiments, if the create bit is turned on, it may signify that the associated target system is yet to complete replication of the create operation to the home site. When the replication successfully completes with remote site, an acknowledgement (ACK) may be received by the home site from the target site. The ACK may then be used to turn the associated inode bit off.

In some multi-site replication embodiments, some embodiments may maintain a plurality of queues, one for each target site (e.g., on the gateway device). These queues may contain a sequence of IO operations captured by the gateway device representing the IO operations that were performed on the local filesystem/fileset. When a new IO operation is performed at the cache, each of the plurality of queues may get enqueued with this IO operation. When that operation is replicated to the associated backup site, the IO operation is dequeued from the associated queue (and only that queue). Advantageously, this decision may be binary in nature.

In some embodiments, when the home system gets an ACK reply indicating that a file was replicated to a site, that successful acknowledgement of the operation may be reflected on the inode bit in the cache system. In some embodiments, status information for the entire collection of target sites may be stored in a file structure, such as a single inode bit, stored in a memory of the gateway device. This inode bit in such embodiments may encode states for the fileset such that the system and/or administrator can understand whether or not the fileset has completed any particular replication operation. The replication structure stored on the gateway device may also include the queues and various configurable information for the backends. Based on the communication with the home site, the replication state of the fileset may be reflected on this in memory structure based on which the queue of operations is either attempted to play or kept halted because the home site is not yet ready to take operations.

Accordingly, one feature and advantage of some embodiments is the ability to push data from a cache over to a remote site adapted for both a one-to-one mapping for SW mode and a many-to-one mapping in case of MW mode. Moreover, the many-to-one mapping may be a mere extension of the one-to-one mappings of SW mode, such that multiple cache sites can point to a single home site. Moreover, because MW mode can both push and pull, some embodiments can maintain accuracy and completeness data at any one site by combining the local data generated and the remote data acquired in a seamless fashion. Additionally, some embodiments may provide a way to exactly identify every target that is connected with remote site and its protocol, and to replicate the data using file handles, and to provide records/status with respect to every connected target and file (e.g., file is replicated, pending, etc.)

Embodiments of the present disclosure may be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Although the above embodiments of the present disclosure each have been described by stating their individual advantages, respectively, the present disclosure is not limited to a particular combination thereof. To the contrary, such embodiments may also be combined in any way and number according to the intended deployment of present disclosure without losing their beneficial effects.

Data Processing System (DPS)

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and the number, type, and configuration of such components may vary.

The DPS 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interface 114 in this embodiment may connect the system bus 122 to one or more mass storage devices, such as a direct access storage device 140, a USB drive 141, and/or a readable/writable optical disk drive 142. The network interface 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard, mouse, modem, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
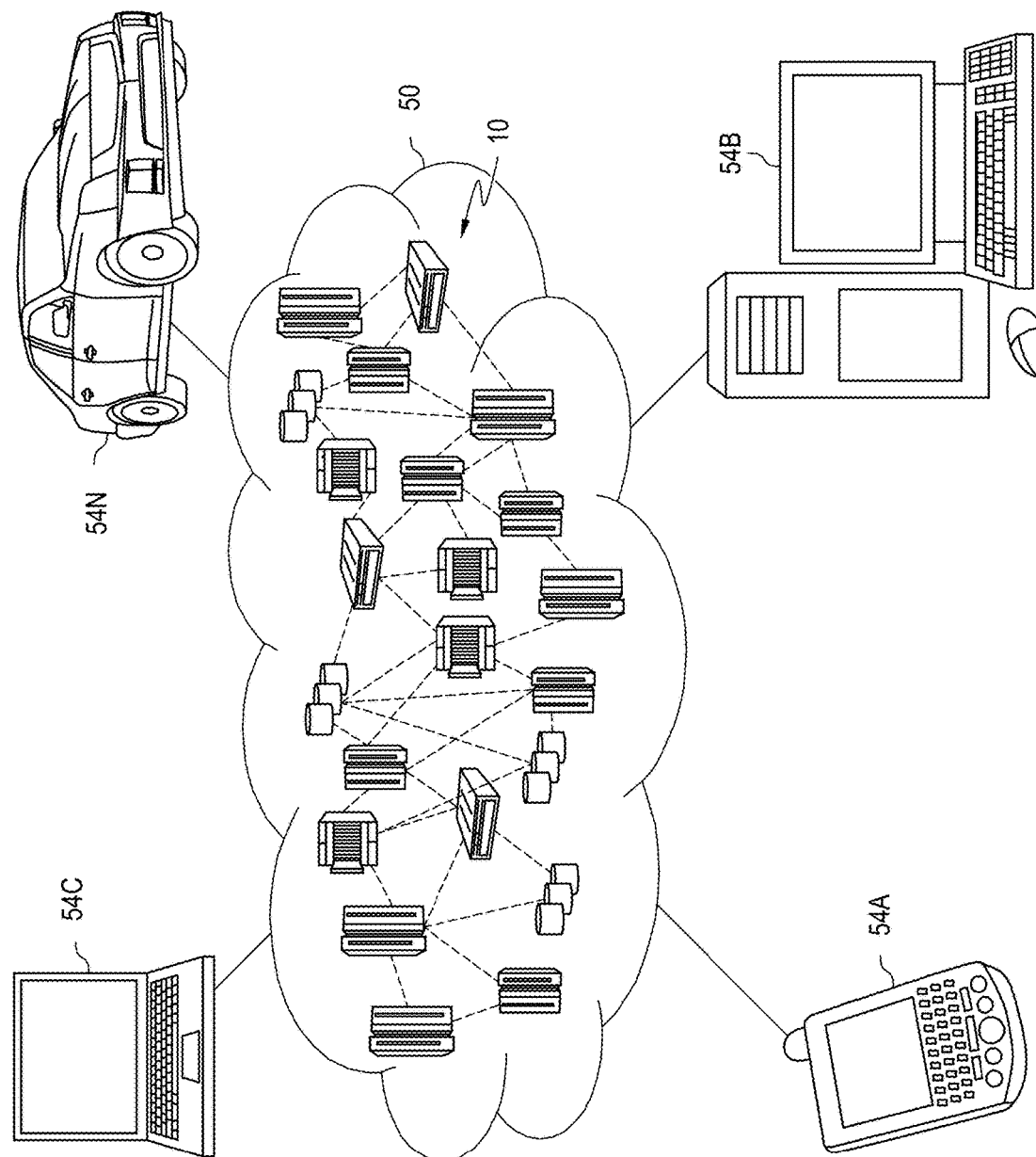
FIG. 2 illustrates one embodiment of a cloud environment suitable for enabling a confidentiality-based intelligent task routing service mesh, consistent with some embodiments.

FIG. 2 illustrates one embodiment of a cloud environment suitable for enabling a cloud object storage system suitable for receiving replication requests from one or more DPS, such as DPS 100. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
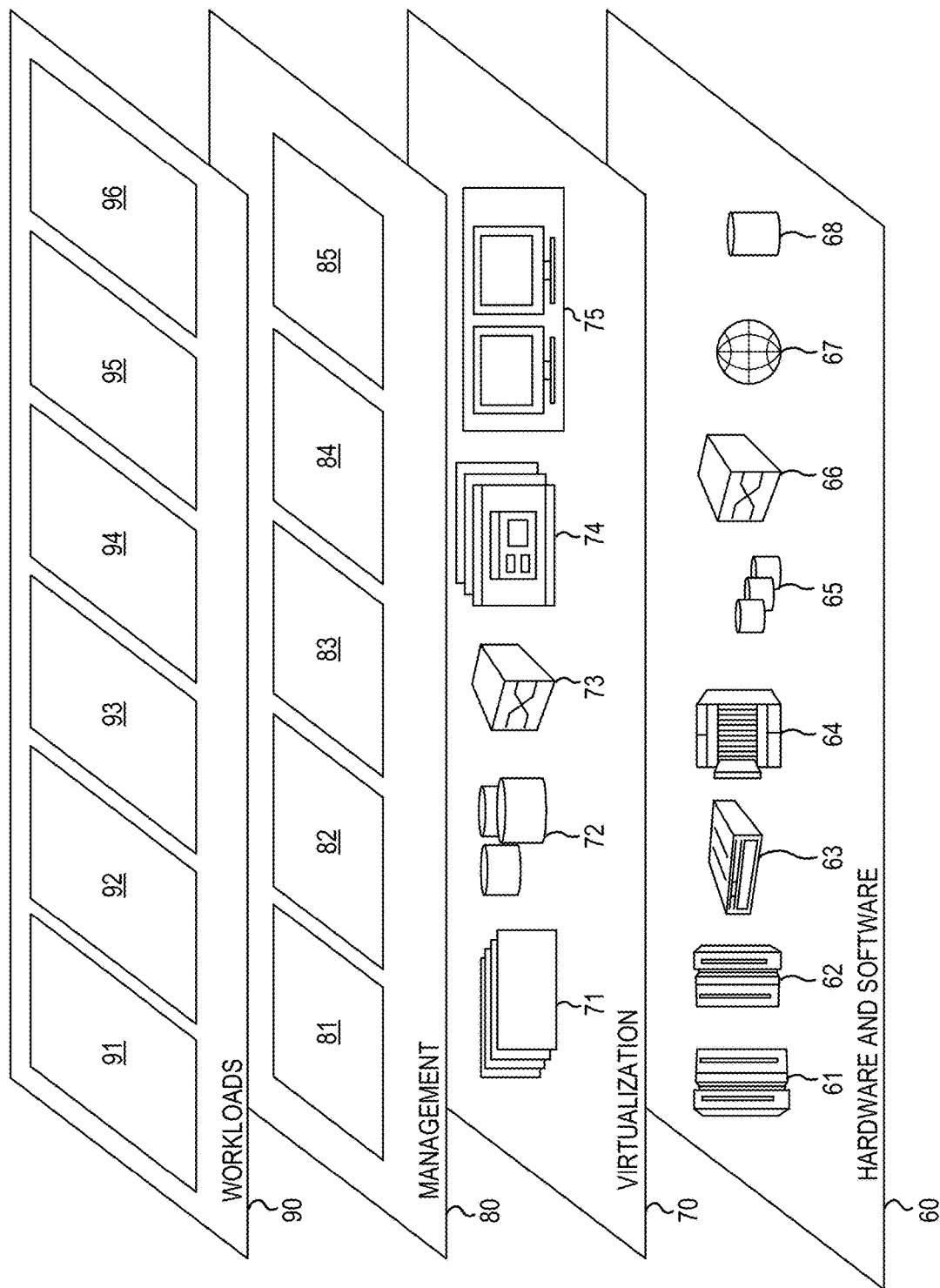
FIG. 3 shows a set of functional abstraction layers provided by a cloud computing environment, consistent with some embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and metering service 96 for storage and Input/Output (I/O) utilization.

Replication Systems

Figure 4:
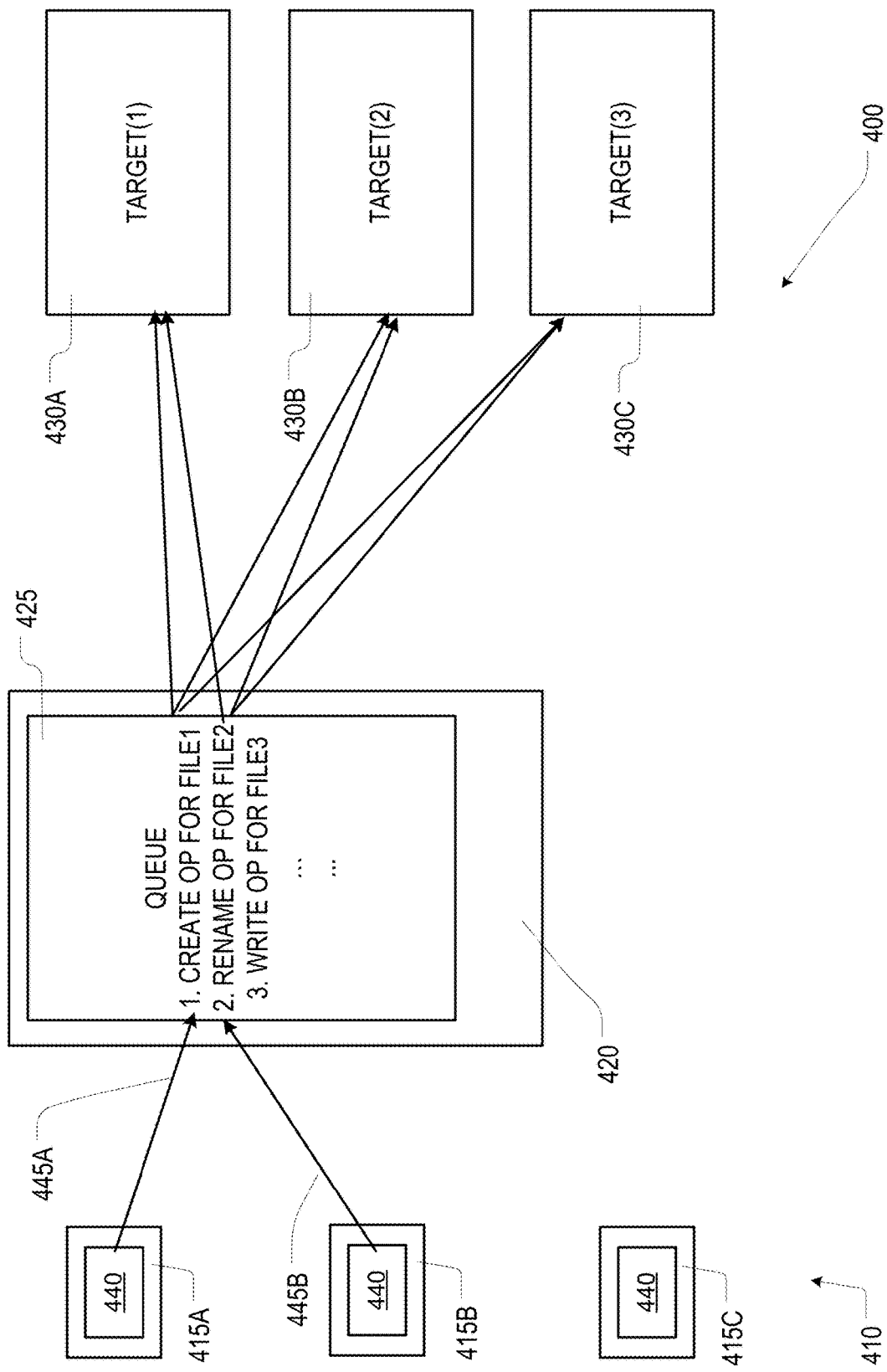
FIG. 4 is a system diagram of a replication system operating in SW mode, consistent with some embodiments.

FIG. 4 is a system diagram of a replication system 400 operating in SW mode, consistent with some embodiments. This replication system 400 may comprise a primary/cache cluster 410 and a target system 430. The primary/cache cluster 410 may comprise a plurality of application nodes 415A-415N and a gateway device 420. The gateway device 420, in turn, contains a replication queue 425. The queue 425 may be associated via a remote mount from the gateway device 420 to the target system 430. The target system 430 comprise a single DPS 100, a storage cluster of DPS 100, or cloud object storage system (see FIGS. 2-3) in some embodiments.

In operation, applications 440 executing on the application nodes 415A-415N may issue a plurality of input/output (I/O) commands 445A-445N (only some depicted for clarity). These I/O commands 445A-445N may be added to queue 415 as enqueued I/O commands 425A-425N. The gateway device 420 may utilize the queue 425 to both replicate each of the enqueued I/O commands 425A-425N to the target system 430. The gateway device 420 may also use the queue 425 to track a replication status for each of those enqueued I/O commands $425_1$-$425_N$. This tracking may include receiving acknowledgements 455A-455N from the target system 430 upon completion of each enqueued I/O command 425A-425N.

Figure 5:
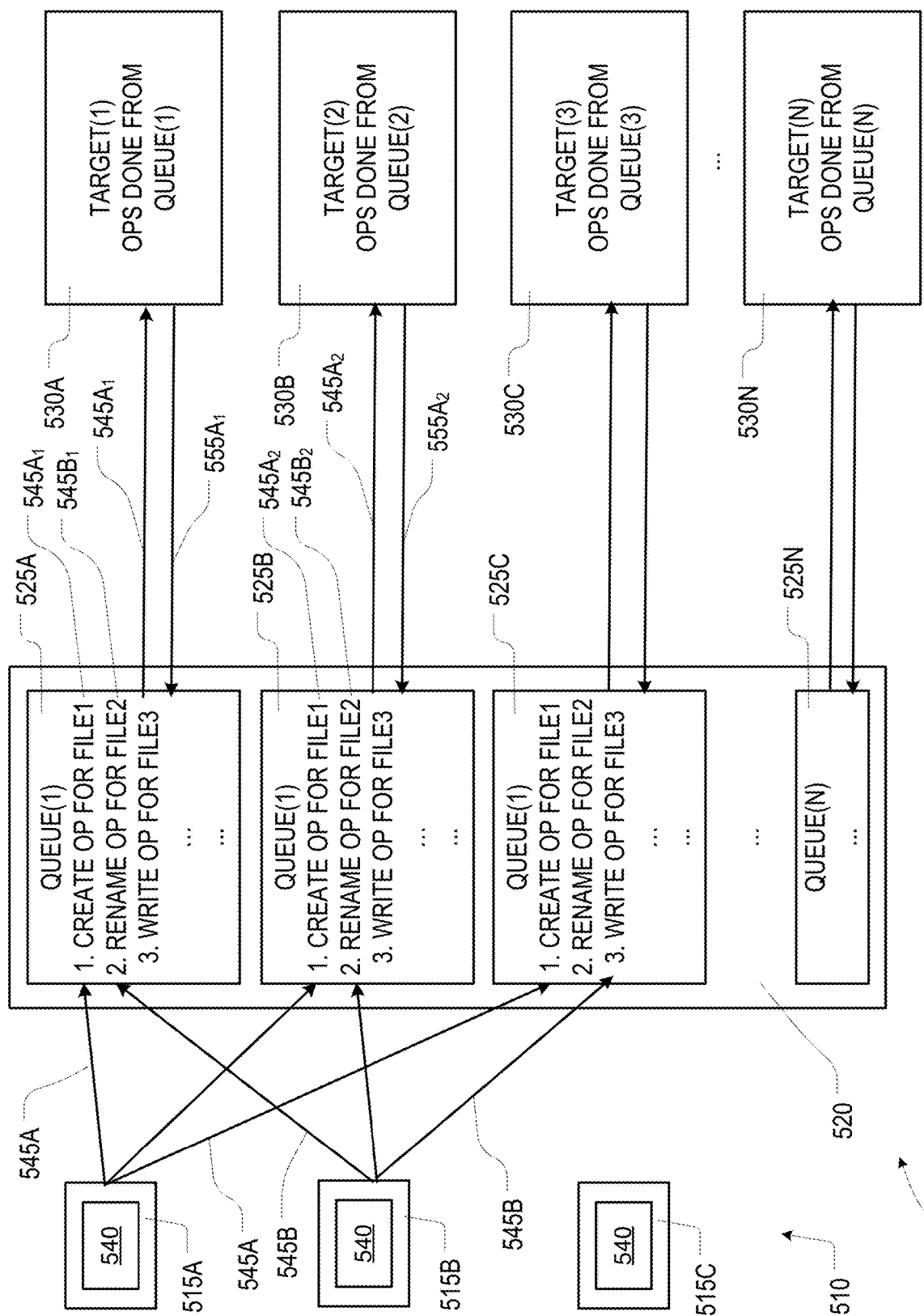
FIG. 5 is a system diagram of a replication system operating in MW mode, consistent with some embodiments.

FIG. 5 is a system diagram of a replication system 500 operating in MW mode, consistent with some embodiments.

This replication system 500 may comprise a primary/cache cluster 510 and a plurality of target systems 530A-530N. The primary/cache cluster 510 may comprise a plurality of application nodes 515A-515N and a gateway device 520. The gateway device 520, in turn, contains a plurality of queues 525A-525N. Each of the queues 525A-525N may be associated with one of the plurality of targets systems 530A-530N. For example, queue 525A may be associated via a remote mount from the primary gateway device 520 to the target 530A, queue 525B may be associated via a remote mount from the primary gateway device 520 to the target 530B, etc. The target systems 530A-530N may each comprise a single DPS 100, a storage cluster of DPS 100, a cloud object storage system (see FIG. 2-3), or a combination thereof, in some embodiments.

In operation, applications 540 executing on the application nodes 515A-515N may issue a plurality of input/output (I/O) commands 545A, 545N, etc (only some depicted for clarity). These I/O commands 545A, 545B, etc., may be added onto each of the plurality of queues 525A-525N as enqueued commands I/O commands $545A_1$, $545A_2$, $545B_1$, $545B_2$, etc. (only some labelled for clarity). The gateway device 520 may utilize these queues 525A-525N to individually replicate the enqueued commands $550A_1$-$550M_N$ (only command 545A shown for clarity) to each of the respective targets 530A-530N. The gateway device 520 may also use these queues 525A-525N to individually track a replication status for each of those I/O commands 545A, 545B, etc with respect to each of the targets. This tracking may include receiving acknowledgements $555A_1$, $555A_2$, $555B_1$, $555B_2$, etc. (only ACK 555 shown for clarity) from each of the targets 530A-530N upon completion of the replication.

More specifically, the embodiment in FIG. 5 may include a separate cache record that can store a target path and associated configuration (e.g., internet address, connection port, communication protocol, etc.) as part of the fileset for each of the replication targets 530A-530N. For example, if one fileset primary/cache cluster 510 is connected with three targets 530A-530C, then the cache record of this fileset may be chained into three entries and can be referenced according to target sites 530A-530. This on-disk information may be changed when a target site 530A-530 is added or removed.

In some embodiments, the targets systems 530A-530N may be processed in an order specified in the cache record (e.g., which may read as target1, target2, target3, . . . , targetN). This order may be used as a priority for replication to that target systems. That is, the specified order may be used in part to which operations 545 get prioritized with respect to which target systems 530A-530N by the gateway device 520. For example, target1 530A may have the highest priority and targetN 530N may have the lowest priority in terms of order and speed with which replication is performed. One feature and advantage of these embodiments is that they may be able to guarantee that that, e.g., target1 530A gets this data first (i.e., even ahead of target2 530B), and so on until targetN 530N. This, in turn, may help reduce, or even minimize, conflicts when performing local updates regarding the replication states to the local inode of the file/object being replicated.

The embodiment in FIG. 5 may use inode bits to independently track a replication state of each operation 545 in each of the plurality of queues 525A-525N with respect to each associated target system 530A-530N. These may be stored as part of the local inode on the cache system. In one embodiment, the bits on the inode that are set for replication may include:

Create Bit—set when a file has been created on the primary/cache cluster 510, which should be replicated to the associated target site 530A-530N. The create bit may be reset when the file's create IO operation has been successfully replicated to the associated remote site.

Dirty Bit—set when the file has had in-place data written on it at the primary/cache cluster 510, which should be replicated to the associated target site 530A-530N. The dirty bit may be reset when the file's write has been successfully replicated to the associated target site 530A-530N.

Append Bit—set when the file has had data write beyond the last known offset on the file at the primary/cache cluster 510, which should be replicated to the associated target site 530A-530N. The append bit may be reset when the file's write has been successfully replicated to the associated target site 530A-530N.

SetAttr Bit—set when the file has had an attribute change on it at the primary/cache cluster 510, which should be replicated to the associated target site 530A-530N. The setattr bit may be reset when the file's attribute change has been successfully replicated to the target site 530A-530N.

State Bit—set when the file has been created on the primary/cache cluster 510, which should be replicated to the target site 530A-530N. The state bit may return remote attributes of the file's counterpart at the target site 530A-530N. When the state bit is set, it may indicate that the file is available at the target site 530A-530N and the local counterpart has attributes about its remote counterpart. The state bit may be reset when the file is renamed, removed, and/or recreated at the target site 530A-530N, and now should be revalidated back into the primary/cache cluster 510. The state bit may not be used in some embodiments operating in DR mode because the backup site is typically passive and cannot take updates directly from the applications. Instead, in DR functionality, the state bit may not be set when the file is initially created (e.g., with create bit on), but when it gets replicated to the backup site, the state bit may be set. Some embodiments may not reset the state bit unless the file is removed or renamed.

Cached Bit—Set when the file is completely available on the primary/cache cluster 510. The cached bit may not be used in some DR setup embodiments and/or may not be reset, as all the IO is performed on the production site in disaster recovery (DR) mode.

Local Bit—Set when the file updates should remain local within the primary/cache cluster 510. As such, some embodiments may not replicate it to the target site 530A-530N. Additionally, this bit may only be applicable in some embodiments for certain special directories on the primary/cache cluster 510 that maintain local replication information and in certain modes of replication.

Reset—this inode bit may be used to represent a combination of which target site 530A-530N an I/O command has and has-not been replicated in some embodiments. Because the target site 530A-530N may be sequenced 1 through N, some embodiments may can define an order to be appended to the inode bits so that a simple logical AND operation with this reset bit may reflect to it whether the inode operation represented by the bit has been replicated to the target site 530A-530N. The ordered numbers in some embodiments may be determined using a two (2) to the power of (N–1), where N is the target in question. For example, the order appended to the inode replication status bit will be one (1) for target1, two (2) for target2, four (4) for target3, eight (8) for target4, etc., or more generally two (2) to the power (N–1) for targetN.

In the case of a single remote site, like that described with reference to FIG. 4, the reset inode bit may take a binary form, e.g., denoting replication is pending if its value is 1, and replication is completed when its value becomes 0. In the case of multi-target replication, like that described with reference to FIG. 5, the reset inode bit may go through a variety of values. For example, in a simple scenario of cache replicating to 3 target sites (target1, target2 and target3), the inode reset bit might take values from 0 to 7 (i.e., (2 to the power 3)–1). In this example, each value of the reset bit may represent the following states:

A reset inode value of 0 may represent that the inode operation in question, represented by the inode bit (say create/dirty/setattr) has been replicated to all the remote sites in question.

A reset inode value of 1 may represents that the inode is pending replication to target1 is pending and has completed to target2 and target3.

A reset inode value of 2 may represent that the inode is pending replication to target2 is pending and has completed to target1 and target3.

A reset inode value of 3 may represent that the inode is pending replication to both target1 and target2, but has completed to target3.

A reset inode value of 4 may represent that the inode is pending replication to target3 is pending and has completed to target1 and target2.

A reset inode value of 5 may represent that the inode is pending replication to both target1 and target3, but has completed to target2.

A reset inode value of 6 may represent that the inode is pending replication to both target1 and target2, but has completed to target3.

A reset inode value of 7 may represent that the inode is pending replication to all three targets i.e., target1, target2 and target3.

In the single-replication case described with reference to FIG. 4, each inode bit used to occupy just 1 byte on the inode. In the multi-target replication scenario described with reference to FIG. 5, the 7 inode bits may each take 7 bytes on the inode to be stored (i.e., because they are Boolean in nature).

To improve scaling for applications with many target sites 530A-530N, the reset bit in some embodiments may be an Int8 or an Int16 value, both of which occupy four bytes on the inode for each replication. For even larger scale applications, a 32-bit Int may be used. Advantageously, even the 32-bit Int in these embodiments only takes four bytes on the inode, which may allow all seven replication bits together to take up to 28 bytes now (as compared to seven bytes in the single target case), which may be easily accommodated by the inode size specified in most modern filesystems.

Some embodiments may further include a replication data structure (also referred to as a handler). For multiple site replication, the handler may comprise two separate components: (i) a fixed component, which may carry all the common configurations (e.g., config values) for the local cache site(s). These may remain common to all the target sites 530A-530N, and hence, may use one copy in memory for the sake of replication on the gateway device 520. This may start from the configured method to reach the target sites 530A-530N (e.g., the http/https protocol part, the COS server address and bucket names at the target site in case of e.g., a Cisco Cloud Object Storage (COS) backend; the NFS server name, IP address, port number, and remote exportPath name for a NFS backend, a unique mount path for native filesystem backends, etc.); and (ii) a queue per target site 530A-530N to track/manage replication. The replication structure may comprise unique copies of the queues to be stored in memory of the gateway device 520 for each target site 530A-530N so that, as and when one operation completes with respect to each target site 530A-530N, the handler can simply dequeue the associated operation from the queue associated with that particular remote site independent of the queues for the other remote sites. Thus, for example, if one queue is dequeue, then other running queue(s) may not be impacted. Accordingly, one feature and advantage of these embodiments is that, because the target sites may comprise different backends, not all target sites 530A-530N will behave the same, and hence one queue might flush faster while the other queue might take longer to flush. Similarly, some remote sites might report replication error and one of the queues can even get stale.

In some embodiments, the handler on the gateway device 520 for a given filesystem/fileset that replicates to multiple remote sites may have the following characteristics: (i) the parent handler may hold all the common configuration settings for the given replication system to all the remote sites that are involved. Thus, even one of these configuration changes, it will be applicable to all the N remote replication sites that the systems may interact with; and (ii) multiple children handler, each of which may be dependent on the target sites 530A-530N it replicates to. These child handlers may have a configuration that may only apply to the particular target site 530A-530N that it replicates to, and to the queue of operations that need to be replicated to the associated target site 530A-530N.

Additionally, some embodiments may enable quality of service (QoS) based resource allocations per queue based on a weighting calculated per target site (where the weightings may be calculated on the cost and resource quota factors of target sites 530A-530N as well the wait tolerance of applications residing at secondary/cloud sites).

Figure 6:
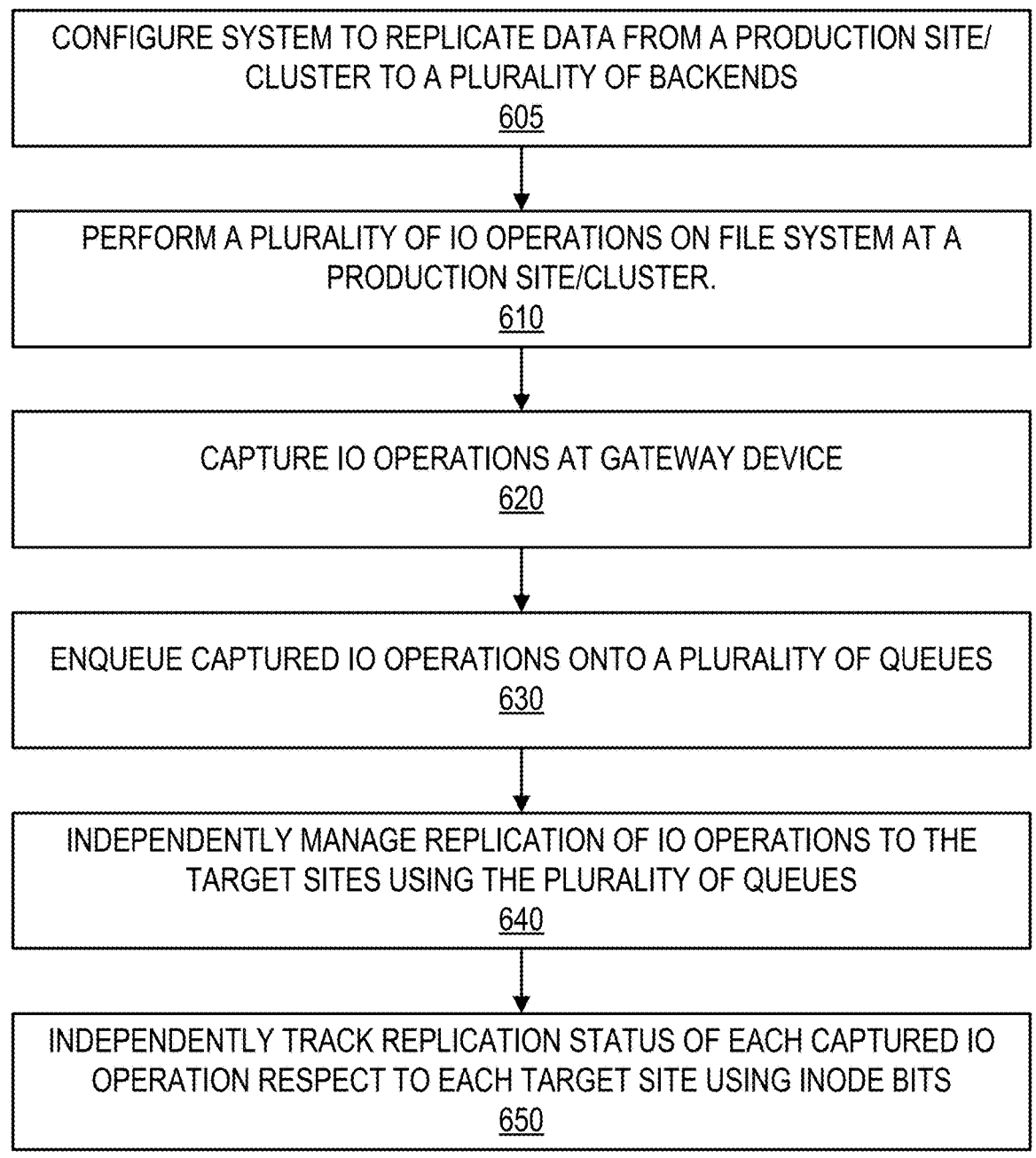
FIG. 6 is a flow chart illustrating one multi-protocol multi-site replication method, consistent with some embodiments.

FIG. 6 is a flow chart illustrating one multi-protocol multi-site replication method 600, consistent with some embodiments. At operation 605, the system may be configured to replicate data from a production site/cluster to a plurality of backends. Some of the backends may be managed by a first cloud vendor and some may be managed by a second, different cloud vendor. Connection information for the cloud vendors may be stored in the filesystem in some embodiments.

At operation 610, a plurality of IO operations is performed on a filesystem at a production site/cluster. Next, at operation 620, a gateway device associated with the production site/cluster captures the IO operations. In response, the gateway device may enqueue the captured IO operations onto a plurality of queues at operation 630. Each of the plurality of queues may be associated with one of the target sites. At operation 640, the gateway device may independently manage replication of the IO operations to the target sites using a plurality of queues stored in memory. In some embodiments, the gateway device may also independently track a replication status of each captured IO operation with respect to each target site using the inode bits of its local filesystem at operation 650. In some embodiments, one of the inode bits may encode a plurality of replication states for reach of the remote sites, including whether replication is pending and replication is completed. The number of the inode bits may be based on a number of target sites.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. Therefore, it is desired that the embodiments described herein be considered in all respects as illustrative, not restrictive, and that reference be made to the appended claims for determining the scope of the invention.

What is claimed is:

1. A method for multi-site replication from a single production site, comprising:
    capturing, at a gateway node, input/output ("IO") operations performed on a local filesystem, the local filesystem having mode bits;
    enqueuing the captured IO operations onto each of a plurality of queues, wherein each of the plurality of queues is associated with one of a plurality of target sites;
    replicating the captured IO operations to each of the plurality of target sites; and
    independently tracking a status of the replication of the captured IO operations to each of the plurality of target sites using a current value of one or more of the mode bits.

2. The method of claim 1, wherein a number of the mode bits is based on a number of target sites.

3. The method of claim 1, wherein at least one of the mode bits encodes one of a plurality of replication statuses for each of the remote sites.

4. The method of claim 3, wherein the replication statuses are chosen from the group consisting of replication is pending and replication is completed.

5. The method of claim 1, wherein a first of the plurality of target sites comprises a first backend; and wherein a second of the plurality of target sites comprises a second backend, the second backend being different from the first backend.

6. The method of claim 1, wherein managing replication of the IO operations comprises maintaining a parent and a children handler on the gateway device.

7. The method of claim 1, wherein each of the plurality of queues is responsible to replicate data to a target cloud; and further comprising:
    receiving an acknowledgement (ACK) from one of the target clouds, and in response, updating the current value of one or more of the mode bits.

8. The method of claim 1, further comprising:
    metering IO operations to be replicated; and
    generating an invoice based on the metered use.

9. A system for multi-site replication from a single production site, the system comprising:
    one or more processors; and
    a memory communicatively coupled to the one or more processors;
    wherein the memory comprises instructions which, when executed by the one or more processors, cause the one or more processors to perform a method comprising:
        capturing, at a gateway node, input/output ("IO") operations performed on a local filesystem, the local filesystem having mode bits;
        enqueuing the captured IO operations onto each of a plurality of queues, wherein each of the plurality of queues is associated with one of a plurality of target sites;
        replicating the captured IO operations to each of the plurality of target sites; and
        independently tracking a status of the replication of the captured IO operations to each of the plurality of target sites using a current value of one or more of the inode bits.

10. The system of claim 9, wherein a number of the mode bits is based on a number of target sites.

11. The system of claim 9, wherein at least one of the mode bits encodes one of a plurality of replication statuses for each of the remote sites.

12. The system of claim 11, wherein the replication statuses are chosen from the group consisting of replication is pending and replication is completed.

13. The system of claim 9, wherein a first of the plurality of target sites comprises a first backend; and wherein a second of the plurality of target sites comprises a second backend, the second backend being different from the first backend.

14. The system of claim 9, wherein managing replication of the IO operations comprises maintaining a parent and a children handler on the gateway device.

15. The system of claim 9, wherein each of the plurality of queues is responsible to replicate data to a target cloud.

16. The system of claim 9, wherein the method further comprises:
    metering IO operations to be replicated; and
    generating an invoice based on the metered use.

17. A computer program product for multi-site replication from a single production site, the computer program product comprising a computer readable storage medium having program instructions embodied therewith, the program instructions executable by a computer to perform a method comprising:
    capturing, at a gateway node, input/output ("IO") operations performed on a local filesystem, the local filesystem having mode bits, wherein:
        a number of the mode bits is based on a number of target sites; and
        wherein one of the mode bits encodes one of a plurality of replication states for each of the remote sites;
    enqueuing the captured IO operations onto each of a plurality of queues, wherein each of the plurality of queues is associated with one of a plurality of target sites;
    replicating the captured IO operations to each of the plurality of target sites; and
    independently tracking a status of the replication of the captured IO operations to each of the plurality of target sites using a current value of one or more of the mode bits.

18. The computer program product of claim 17, wherein a first of the target sites comprises a first backend; and wherein a second of the target sites comprises a second backend, the second backend being different from the first backend.

19. The computer program product of claim 17, wherein managing replication of the IO operations comprises maintaining a parent and a children handler on the gateway device.

20. The computer program product of claim 17, wherein the method further comprises:
   metering IO operations to be replicated; and
   generating an invoice based on the metered use.

\* \* \* \* \*